Patented Aug. 13, 1940

2,211,339

UNITED STATES PATENT OFFICE 2,211,339

AZO COMPOUNDS AND MATERIAL COLORED THEREWITH

James G. McNally and Joseph B. Dickey, Rochester, N. Y., assignors to Eastman Kodak Company, Rochester, N. Y., a corporation of New Jersey No Drawing. Application April 15, 1939, Serial No. 268,125

11 Claims. (Cl. 260—193)

Our invention relates to new azo dye compounds and their application to the art of dyeing or coloring. More particularly, the invention relates to aromatic azo dye compounds and to material made of or containing an organic derivative of cellulose colored with the nuclear non-sulfonated azo dye compounds of the invention.

Organic derivatives of cellulose are characterized by an indifferent affinity for the usual cotton and wool dyes, especially the ordinary water soluble dyes. Because of this, it has been necessary to develop new dye compounds suitable for the dyeing or coloration of materials such as textile materials made of or containing an organic derivative of cellulose. It is, accordingly, an object of our invention to provide a new class of azo dyes suitable for the dyeing or coloration of organic derivatives of cellulose. Another object of our invention is to produce dyeings on organic derivatives of cellulose which are of good fastness to light and washing. A further object is to provide a process for the dyeing or coloration of organic derivatives of cellulose. A still further object is to provide a process for the coloration of organic derivatives of cellulose in which the dye or dyes are applied directly to the material undergoing coloration from an aqueous suspension.

Typical organic derivatives of cellulose include the hydrolyzed as well as the unhydrolyzed cellulose organic acid esters, such as cellulose acetate, cellulose formate, cellulose propionate, or cellulose butyrate, and the hydrolyzed as well as the unhydrolyzed mixed organic acid esters of cellulose, such as cellulose acetate propionate, cellulose acetate-butyrate, and the cellulose ethers, such as methyl cellulose, ethyl cellulose or benzyl cellulose. While our invention will be described more particularly in connection with the dyeing of cellulose acetate silk, it will be understood that the dye compounds of the invention are applicable to the coloration of other organic derivatives of cellulose such as those just mentioned.

The dye compounds of our invention consist of azo dye compounds selected from the group consisting of azo compounds having the general formulae:

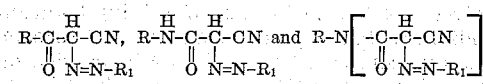

wherein R represents the residue of an aromatic nucleus and R₁ represents the radical of a diazotized aromatic amine. Advantageously, R is the residue of an aryl nucleus of the benzene series and R₁ is a radical of a diazotized arylamine of the benzene series.

The nuclear non-sulfonated azo compounds of our invention constitute valuable dyes for the coloration of organic derivatives of cellulose yielding various shades thereon as indicated hereinafter. These compounds similarly possess application for the coloration of wool and silk and yield the same or generally similar shades thereon as they do on cellulose acetate silk. The compounds included within the scope of the general formulae given which contain a nuclear sulfonic acid group possess little or no utility for the coloration of organic derivatives of cellulose but can be employed to color textile materials such as wool and silk. These sulfonated compounds can be prepared by sulfonation of the corresponding unsulfonated azo compounds or by the use of suitably sulfonated intermediates in their preparation. For the dyeing of organic derivatives of cellulose such as cellulose acetate silk, nuclear non-sulfonated compounds, wherein R is the residue of an aryl nucleus of the benzene series and R₁ is the radical of a diazotized arylamine of the benzene series are generally advantageous.

The azo dye compounds of our invention can be prepared by diazotizing a primary aromatic amine and coupling the diazonium compound obtained with a coupling component selected from the group consisting of coupling components having the general formula:

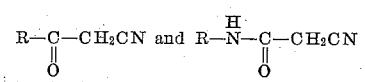

wherein R represents the residue of an aromatic nucleus. Where compounds having the formula:

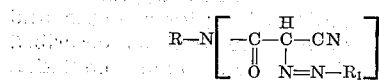

are to be prepared, two mole equivalents of a diazotized aromatic amine to one mole equivalent of the coupling component will be employed. Similarly the amount of alkali in the coupling bath should be increased over that where mole equivalent weights of the coupling and diazonium compounds are employed.

Aromatic amines that can be diazotized and employed in the preparation of the azo compounds of our invention include, for example, aniline, nitro substituted anilines, such as p-nitroaniline and 2,4-dinitroaniline, halogen substituted anilines, such as p-chloroaniline, o-chloro-p-nitroaniline, o-bromoaniline, p-iodoaniline and 2,4-dichloroaniline, alkyl substituted anilines such as o-methylaniline, p-ethylaniline, o-β-methoxyethylaniline and o-chloro-p-methylaniline, alkoxy substituted anilines, such as p-methoxyaniline, o-β-methoxyethoxyaniline and p-butoxyaniline, keto substituted anilines such as p-aminoacetophenone and p-aminophenyl propyl ketone, sulfonated anilines such as 1-amino-2-sulfonic benzene and 1-amino-2-sulfonic-4-nitrobenzene and naphthylamines such as α-naphthylamine, β-naphthylamine, 1-amino-4-hydroxynaphthalene, 1-amino-2-sulfonic naphthalene, 1-amino-4-nitronaphthalene, and 1-amino-8-hydroxynaphthalene. Further, aromatic amines such as p-aminobenzophenone, o-aminobenzophenone, p-aminodiphenylamine, and p-aminoazobenzene can be used. The aromatic amines disclosed herein are given by way of example and are not intended to be limitative of the invention. Any of the aromatic amines disclosed herein can be diazotized and the diazonium compound resulting coupled with any of the coupling components disclosed herein to obtain dye compounds of the invention.

Aromatic coupling components, in addition to those disclosed in the examples given hereinafter, which may be employed in the preparation of the dye compounds of our invention, include, for example, o-chloro-p-nitrobenzoylacetonitrile, o-chloro-p-nitrocyanoacetanilide, o-methoxybenzoylacetonitrile, p-methylbenzoylacetonitrile,

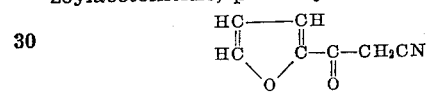

and

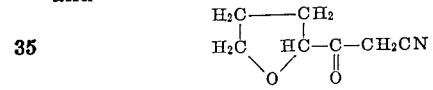

The following examples illustrate the preparation of the dye compounds of our invention:

Example 1

9.3 grams of aniline are dissolved in 100 cc. of water to which has been added 25 cc. of 36% hydrochloric acid. This solution is cooled to a temperature approximating 0–5° C. and the aniline is diazotized while maintaining this temperature by the addition, with stirring, of a water solution of 6.9 grams of sodium nitrite.

14.5 grams of benzoylacetonitrile,

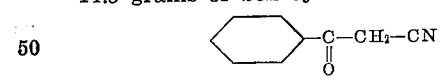

are dissolved in 500 cc. of water containing 10 grams of sodium hydroxide. The resulting solution is cooled to a temperature approximating 0–10° C. by the addition of ice, for example, and the diazonium solution prepared as described above is added with stirring. Upon completion of the coupling reaction which takes place, the mixture is made acid to litmus by the addition of hydrochloric acid following which the dye compound formed is recovered by filtration, washed with water and dried. The dye compound obtained colors cellulose acetate silk a greenish yellow shade.

An equivalent weight of cyanoacet-α-naphthylamide,

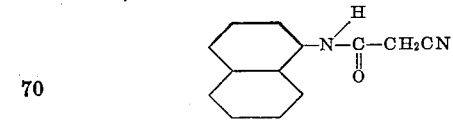

can be substituted for the benzoylacetonitrile of the example to obtain a dye compound of our invention. This dye compound colors cellulose acetate silk a yellow shade.

Example 2

12.3 grams of o-anisidine are diazotized in known fashion and the diazonium compound obtained is coupled with 19.0 grams of p-nitrobenzoylacetonitrile,

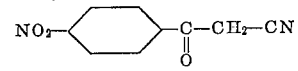

Coupling and recovery of the dye compound may be carried out as described in Example 1. The dye compound obtained colors cellulose acetate silk a golden yellow shade.

An equivalent weight of m-chloro-di-cyanoacetanilide,

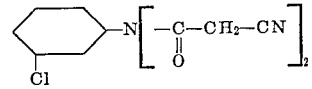

may be substituted for the p-nitrobenzoylacetonitrile of the example to obtain a generally similar dye. This dye compound colors cellulose acetate silk a yellow shade.

Example 3

15 grams of p-aminoacetanilide are diazotized and the diazonium compound obtained is coupled with 21.4 grams of 2,4-dichlorobenzoylacetonitrile,

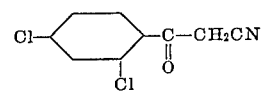

The coupling reaction and recovery of the dye compound formed may be carried out as described in Example 1. The dye compound obtained colors cellulose acetate silk an orange-yellow shade.

Example 4

17.3 grams of 1-amino-2-chloro-4-nitrobenzene are diazotized and the diazonium compound obtained is coupled with 19.5 grams of β-naphthoylacetonitrile,

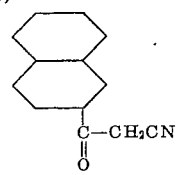

dissolved in 600 cc. of water containing 30 grams of sodium carbonate. The coupling and recovery of the dye compound may be carried out in accordance with the method described in Example 1. The dye compound obtained colors cellulose acetate silk an orange-yellow shade.

Example 5

19.7 grams of p-aminoazobenzene are diazotized and the diazonium compound obtained is coupled with 15.1 grams of ω-cyano-α-thienyl methyl ketone,

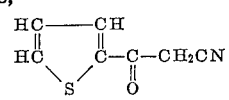

dissolved in 500 cc. of water containing 30 grams of sodium carbonate. The coupling and recovery of the dye compound formed may be carried out in accordance with the method described in Example 1. The dye compound obtained colors cellulose acetate silk a yellowish-orange shade.

Example 6

27.0 grams (0.2 gram mole) of p-aminoacetophenone are diazotized and the diazonium compound obtained is coupled in an alkaline solution with 0.1 gram mole of di-cyano-acetanilide. Upon completion of the coupling reaction, the dye compound formed can be worked up in accordance with the method described in Example 1. The dye compound obtained has the probable formula:

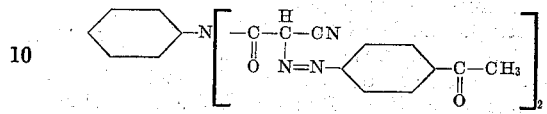

and colors cellulose acetate silk a yellow shade.

The following tabulation further illustrates the compounds included within the scope of our invention together with the color they produce on cellulose acetate silk. The compounds indicated below may be prepared by diazotizing the amines listed under the heading "Amine" and coupling the diazonium compounds obtained with the compounds specified in the column entitled "Coupling component." The diazotization and coupling reactions may, for example, be carried out following the general procedure described in Examples 1 to 6, inclusive.

| Amine | Coupling component | Color on cellulose acetate silk |
|---|---|---|
| Aniline | (1) Benzoylacetonitrile | Greenish-yellow. |
| Do | (2) ω-cyanothienylmethylketone | Do. |
| Do | (3) Di-cyanoacetanilide | Do. |
| Do | (4) 2,4-dichloro-di-cyanoacetanilide | Do. |
| Do | (5) p-Nitrobenzoylacetonitrile | Golden yellow. |
| Do | (6) 2,4-dichlorobenzoylacetonitrile | Do. |
| Do | (7) β-naphthoylacetonitrile | Do. |
| o, m, p-Anisidine | Coupling components 1-4 | Greenish-yellow. |
| Do | Coupling components 5-7 | Golden yellow. |
| o, m, p-Bromoaniline | Coupling components 1-4 | Greenish-yellow. |
| Do | Coupling components 5-7 | Golden yellow. |
| o, m, p-Chloroaniline | Coupling components 1-4 | Greenish-yellow. |
| Do | Coupling components 5-7 | Golden yellow. |
| o, m, p-Fluoroaniline | Coupling components 1-4 | Greenish-yellow. |
| Do | Coupling components 5-7 | Golden yellow. |
| o, m, p-Iodoaniline | Coupling components 1-4 | Greenish-yellow. |
| Do | Coupling components 5-7 | Golden yellow. |
| o, m, p-Nitroaniline | Coupling components 1-6 | Yellow. |
| Do | β-naphthoylacetonitrile | Orange yellow. |
| p-Aminoacetophenone | Coupling components 1-4 | Greenish-yellow. |
| Do | Coupling components 5-7 | Golden yellow. |
| p-Aminoacetanilide | Coupling components 1-7 | Orange yellow. |
| p-Aminoazobenzene | do | Yellowish-orange. |
| 1-amino-2,4-di-nitrobenzene | do | Do. |

It will be understood that two equivalent weights of a diazotized amine may be coupled with the coupling components numbered 3 and 4. Two equivalent weights of the same diazotized amine or one equivalent weight of each of two diazotized amines may be employed. Compounds of this general type wherein two equivalent weights of the diazotized amine are employed may be prepared in accordance with the procedure described more particularly in Example 6. The colors given in the tabulation are those obtained wherein equivalent mole weights of the diazotized amine and coupling component are employed.

The azo dye compounds of our invention are, for the most part, relatively insoluble in water. Those compounds which are insoluble in water may be advantageously employed for the direct dyeing of textile materials by grinding the dye to a fine powder, intimately mixing it with a suitable dispersing or solubilizing agent, and adding the resulting mixture to water or a dilute solution of soap in water to form an aqueous dyebath. Following this known preparation of the dyebath, the textile materials to be dyed may be added to the dyebath and the dyeing operation conducted in known fashion. The dye compounds of our invention which are water soluble do not, of course, require the use of a dispersing or solubilizing agent but may be applied to silk, wool and (depending upon the nature and position of the water-solubilizing group) organic derivatives of cellulose textile materials from an aqueous solution of the dye which may contain salt. For a more complete description as to how the azo dye compounds of our invention may be employed in dyeing or coloring operations, reference may be had to our U. S. Letters Patent No. 2,115,030, issued April 26, 1938.

We claim:

1. Azo dye compounds selected from the group consisting of azo compounds having the general formulae:

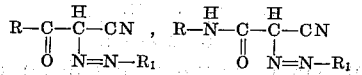

and

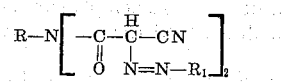

wherein R represents the residue of a member selected from the group consisting of an aryl nucleus of the benzene series, an aryl nucleus of the naphthalene series, a furyl nucleus and a thienyl nucleus and R₁ represents the radical of a diazotized amine selected from the group consisting of an arylamine of the benzene series and an arylamine of the naphthalene series.

2. Azo dye compounds having the general formula:

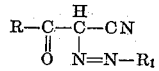

wherein R represents the residue of a member selected from the group consisting of an aryl nucleus of the benzene series, an aryl nucleus of the naphthalene series, a furyl nucleus and a thienyl nucleus and R₁ represents the radical of a diazotized amine selected from the group consisting of an arylamine of the benzene series and an arylamine of the naphthalene series.

3. Azo dye compounds having the general formula:

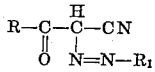

wherein R represents the residue of an aryl nucleus of the benzene series and R₁ represents the radical of a diazotized arylamine of the benzene series.

4. Azo dye compounds having the general formula:

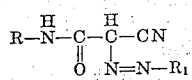

wherein R represents the residue of a member selected from the group consisting of an aryl nucleus of the benzene series, an aryl nucleus of the naphthalene series, a furyl nucleus and a thienyl nucleus and $R_1$ represents the radical of a diazotized amine selected from the group consisting of an arylamine of the benzene series and an arylamine of the naphthalene series.

5. Azo dye compounds having the general formula:

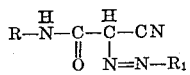

wherein R represents the residue of an aryl nucleus of the benzene series and $R_1$ represents the radical of a diazotized arylamine of the benzene series.

6. Azo dye compounds having the general formula:

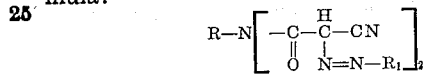

wherein R represents the residue of a member selected from the group consisting of an aryl nucleus of the benzene series, an aryl nucleus of the naphthalene series, a furyl nucleus and a thienyl nucleus and $R_1$ represents the radical of a diazotized amine selected from the group consisting of an arylamine of the benzene series and an arylamine of the naphthalene series.

7. Azo dye compounds having the general formula:

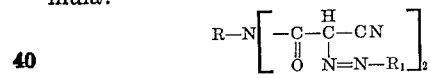

wherein R represents the residue of an aryl nucleus of the benzene series and $R_1$ represents the radical of a diazotized arylamine of the benzene series.

8. Material made of or containing an organic derivative of cellulose colored with a nuclear non-sulfonated azo dye compound selected from the group consisting of azo compounds having the general formulae:

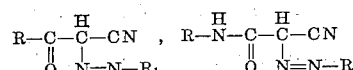

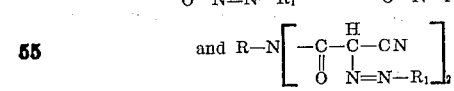

wherein R represents the residue of a member selected from the group consisting of an aryl nucleus of the benzene series, an aryl nucleus of the naphthalene series, a furyl nucleus and a thienyl nucleus and $R_1$ represents the radical of a diazotized amine selected from the group consisting of an arylamine of the benzene series and an arylamine of the naphthalene series.

9. Material made of or containing an organic derivative of cellulose colored with a nuclear non-sulfonated azo dye compound selected from the group consisting of azo compounds having the general formulae:

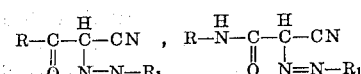

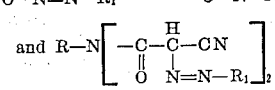

wherein R represents the residue of an aryl nucleus of the benzene series and $R_1$ represents the radical of a diazotized arylamine of the benzene series.

10. Cellulose acetate colored with a nuclear non-sulfonated azo dye compound selected from the group consisting of azo compounds having the general formulae:

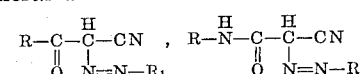

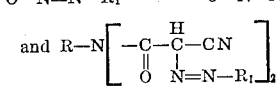

wherein R represents the residue of a member selected from the group consisting of an aryl nucleus of the benzene series, an aryl nucleus of the naphthalene series, a furyl nucleus and a thienyl nucleus and $R_1$ represents the radical of a diazotized amine selected from the group consisting of an arylamine of the benzene series and an arylamine of the naphthalene series.

11. Cellulose acetate colored with a nuclear non-sulfonated azo dye compound selected from the group consisting of azo compounds having the general formulae:

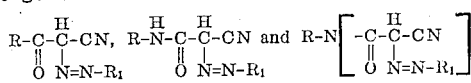

wherein R represents the residue of an aryl nucleus of the benzene series and $R_1$ represents the radical of a diazotized arylamine of the benzene series.

JAMES G. McNALLY.
JOSEPH B. DICKEY.